(12) United States Patent
Lin

(10) Patent No.: US 9,504,935 B2
(45) Date of Patent: Nov. 29, 2016

(54) PROCESS AND APPARATUS FOR TREATMENT OF VOLATILE ORGANIC COMPOUNDS

(71) Applicant: CHENG YUAN ENVIRONMENTAL TECHNOLOGY CO., LTD., Taoyuan County (TW)

(72) Inventor: Yi-Cheng Lin, Taoyuan County (TW)

(73) Assignee: Cheng Yuan Environmental Technology Co., Ltd., Taoyuan (TW)

( * ) Notice: Subject to any disclaimer, the term of this patent is extended or adjusted under 35 U.S.C. 154(b) by 256 days.

(21) Appl. No.: 14/379,386

(22) PCT Filed: Nov. 2, 2012

(86) PCT No.: PCT/CN2012/001485
§ 371 (c)(1),
(2) Date: Aug. 18, 2014

(87) PCT Pub. No.: WO2013/143044
PCT Pub. Date: Mar. 10, 2013

(65) Prior Publication Data
US 2015/0020682 A1    Jan. 22, 2015

(30) Foreign Application Priority Data

Mar. 31, 2012  (CN) .......................... 2012 1 0092287

(51) Int. Cl.
*B01D 53/047* (2006.01)
*B01D 5/00* (2006.01)
(Continued)

(52) U.S. Cl.
CPC ............. *B01D 5/0051* (2013.01); *B01D 5/009* (2013.01); *B01D 5/0027* (2013.01); *B01D 5/0087* (2013.01); *B01D 53/002* (2013.01); *B01D 53/346* (2013.01); *B01D 53/78* (2013.01); *B01D 2252/103* (2013.01); *B01D 2257/708* (2013.01); *B01D 2258/02* (2013.01); *B05D 3/0486* (2013.01)

(58) Field of Classification Search
CPC combination set(s) only.
See application file for complete search history.

(56) References Cited

U.S. PATENT DOCUMENTS 1,134,976 A * 4/1915 Braemer et al. ....... B01D 47/06
                                                                236/44 C
1,568,717 A * 1/1926 Braemer ................... F24D 5/00
                                                                237/78 R
(Continued)

FOREIGN PATENT DOCUMENTS

CN          101987274 a   *  3/2011

*Primary Examiner* — Adam W Bergfelder
(74) *Attorney, Agent, or Firm* — Rosenberg, Klein & Lee

(57) ABSTRACT

A process and apparatus for treatment of volatile organic compounds and the process comprises an untreated airflow dew point temperature sensing step of sensing a dew point temperature of the untreated airflow as a reference temperature, a humidification and condensation processing step of spraying water mist all over the exhaust gas flow and condensing the exhaust gas flow into condensate contained the volatile organic compounds, a treated exhaust gas flow dew point temperature sensing step of sensing a dew point temperature of the treated exhaust gas flow after the humidification and condensation processing step, a collection step of collecting dropped condensate from the humidification and condensation processing step and then transporting the dropped condensate back to the humidification and condensation processing step for circulation spray, and a control step of controlling the dew point temperature of the treated exhaust gas flow to be close to the reference temperature.

9 Claims, 2 Drawing Sheets

(51) Int. Cl.
  *B01D 53/00* (2006.01)
  *B01D 53/34* (2006.01)
  *B01D 53/78* (2006.01)
  *B05D 3/04* (2006.01)

(56) References Cited

U.S. PATENT DOCUMENTS

| | | | | |
|---|---|---|---|---|
| 2,144,693 A | * | 1/1939 | Seid | F24F 3/14 165/249 |
| 2,239,595 A | * | 4/1941 | Cummings, Jr. | F24F 3/14 261/141 |
| 2,262,542 A | * | 11/1941 | Bahnson, Jr. | F24F 3/14 261/138 |
| 2,334,427 A | * | 11/1943 | McGrath | F24F 3/14 236/44 R |
| 4,397,662 A | * | 8/1983 | Bloomer | B01D 47/06 261/106 |
| 4,494,596 A | * | 1/1985 | Bradshaw | B05B 15/1222 165/101 |
| 5,620,503 A | * | 4/1997 | Miller | B01J 19/32 261/128 |
| 6,027,030 A | * | 2/2000 | Buijsse | F24F 3/14 165/229 |
| 6,059,866 A | * | 5/2000 | Yamagata | B01D 45/08 96/251 |
| 6,129,285 A | * | 10/2000 | Schafka | B05B 15/1222 165/226 |
| 2012/0222556 A1 | * | 9/2012 | Filipovic | A61M 16/009 95/142 |
| 2014/0252276 A1 | * | 9/2014 | Chandran | C01B 3/52 252/373 |
| 2014/0314648 A1 | * | 10/2014 | Richardson | B01D 53/60 423/235 |

* cited by examiner

PROCESS AND APPARATUS FOR TREATMENT OF VOLATILE ORGANIC COMPOUNDS

BACKGROUND OF THE INVENTION

1. Field of the Invention

The invention relates to a process and an apparatus for treatment of volatile organic compounds, particularly to a design to increase the humidity of untreated exhaust gas by spraying water mist thereon and then to dehumidify the humidified exhaust gas by condensation for remaining nearly the same humidity ratio of the exhaust through the pre- and post-treatment.

2. Description of the Related Art

Organic solvents are widely used in life and industry, which are easily volatilized into gas at room temperature; therefore, organic solvents are also known as volatile organic compounds. Since the majority of the volatile organic compounds are toxic and harmful to human body, a proper treatment is required for the organic compounds. During the process of the treatment, the exhaust gas is produced and contains water-soluble volatile organic compounds with high boiling point and low vapor pressure, and the water-soluble volatile organic compounds are usually separated from the exhaust gas by a condensing device. A purification device then collects the non-separated volatile organic compounds for incineration or purification treatment of condensation after adsorption and desorption.

FIG. 1 illustrates a conventional condensing device for separating water-soluble volatile organic compounds from exhaust gas, comprising a condenser 11 arranged in an exhaust gas passage 10, allowing an exhaust gas temperature therein dropped below a dew point temperature. The water-soluble volatile organic compounds are separated from the exhaust gas by adsorption of condensed water and condensation of the volatile organic compound itself. The conventional condensing device further comprises a demister 12 or a second condenser (not shown) arranged at a downstream end of the condenser 11 to allow the volatile organic compounds with smaller particle size and water vapor growing for secondary separation or condensation. Moreover, the condensate of the condenser 11 and the demister 12 or second condenser drop in a collecting tank 13 arranged under the condenser 11 and the demister 12. However, the dropped condensate in the collecting tank 13 contains the volatile organic compounds with low concentration which is hard to be recycled and reused. A great amount of waste water with a large amount of volatile organic compounds is also produced, resulting in environmental pollution.

SUMMARY OF THE INVENTION

It is a primary object of the present invention to provide a process and an apparatus for treatment of volatile organic compounds, which hardly produce waste water to solve large amounts of waste water problem of prior art.

It is a second object of the present invention to provide a process and an apparatus for treatment of volatile organic compounds to improve the concentration of volatile organic compounds for recycling and reuse.

It is a third object of the present invention to provide a humidifier and a cryogenic humidifier to wash suspended particle.

In order to achieve the above objects, the present invention includes a process for treating volatile organic compounds contained in exhaust gas flow and for cleaning the suspended particles, comprising:

a) an untreated airflow dew point temperature sensing step of sensing a dew point temperature of the untreated airflow as a reference temperature;

b) a humidification and condensation processing step of spraying water mist all over the exhaust gas flow to increase humidity thereof and condensing the exhaust gas flow into condensate contained the volatile organic compounds;

c) a treated exhaust gas flow dew point temperature sensing step of sensing a dew point temperature of the treated exhaust gas flow after the humidification and condensation processing step;

d) a collection step of collecting dropped condensate from the humidification and condensation processing step and then transporting the dropped condensate back to the humidification and condensation processing step for circulation spray; and f) a control step of controlling the dew point temperature of the treated exhaust gas flow to be close to the reference temperature.

Further, the humidification and condensation processing step is simultaneously carrying out the humidification and condensation by spraying cooled down water mist, or the humidification and condensation processing step is first carrying out by spraying water mist having a temperature close to the reference temperature of step a), then by performing condensation. The present invention further comprises a pre-cooling step before the humidification and condensation processing step.

The first embodiment of the present invention includes an apparatus of treating volatile organic compounds contained in exhaust gas flow, comprising: a first dew point temperature sensor arranged at an entrance of an exhaust gas passage for sensing a dew point temperature of the untreated airflow as a reference temperature; a humidifier arranged in the exhaust gas passage to spray water mist all over the exhaust gas flow for increasing humidity thereof and to wash suspended particle; a condenser arranged in the exhaust gas passage and located at a downstream end of the humidifier to condense the exhaust gas flow into condensate contained the volatile organic compounds; a collecting tank arranged in the exhaust gas passage and located under the humidifier and the condenser to collect the condensate dropped from the humidifier and the condenser and transport the dropped condensate back to the humidifier for circulation spray; a second dew point temperature sensor arranged in the exhaust gas passage to sense a dew point temperature of the treated exhaust gas flow passing through the condenser; and a controller connected to the first dew-point temperature sensor, the condenser and the second dew point temperature sensor for feeding back a dew point temperature of the treated exhaust gas flow sensed by and the second dew-point temperature sensor to the controller to control the condensed level of the condenser and the dew point temperature of the treated exhaust gas flow to be close to the reference temperature sensed by the first dew-point temperature sensor.

The second embodiment of the present invention includes an apparatus of treating volatile organic compounds contained in exhaust gas flow, comprising: a first dew point temperature sensor arranged at an entrance of an exhaust gas passage for sensing a dew point temperature of the untreated airflow as a reference temperature; a cryogenic humidifier arranged in the exhaust gas passage to spray water mist all over the exhaust gas flow for increasing humidity thereof, to cool down and condense the exhaust gas flow into condensate contained the volatile organic compounds and to wash suspended particle; a collecting tank arranged in the exhaust gas passage and located under the cryogenic humidifier to collect the condensate dropped from the cryogenic humidifier and the dropped condensate cooled down by a cooler and then transported back to the humidifier for circulation spray; a second dew point temperature sensor arranged in the exhaust gas passage to sense a dew point temperature of the treated exhaust gas flow passing through the condenser; and a controller connected to the first dew-point temperature sensor, the cooler and the second dew point temperature sensor for feeding back a dew point temperature of the treated exhaust gas flow sensed by and the second dew-point temperature sensor to the controller to control the condensed level of the cooler and the dew point temperature of the treated exhaust gas flow to be close to the reference temperature sensed by the first dew-point temperature sensor.

The present invention further comprises a pre-cooler arranged in the exhaust gas passage and located at an upstream end of the humidifier.

DETAILED DESCRIPTION OF THE PREFERRED EMBODIMENT

Figure 1:
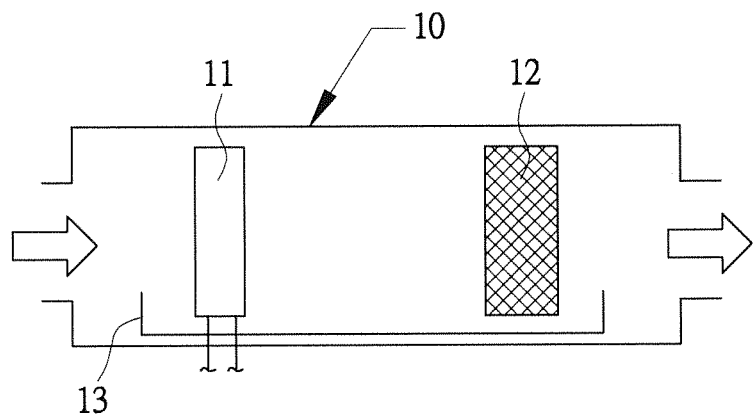
FIG. 1 is a structure schematic view of a conventional device for treatment of volatile organic compounds.
Figure 2:
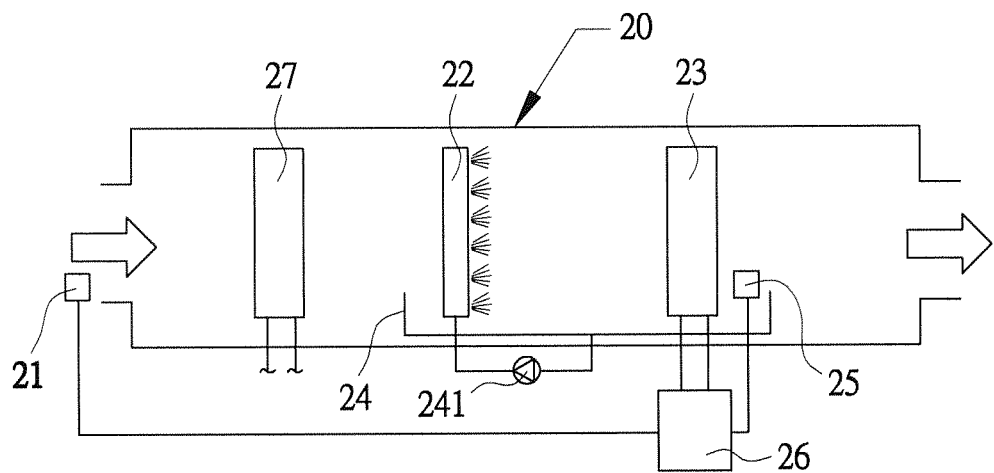
FIG. 2 is a structure schematic view of a first embodiment in accordance with the present invention.

With the referenced to FIG. 2, the first embodiment of the present invention comprises a first dew point temperature sensor 21, a humidifier 22, a condenser 23, a collecting tank 24, a second dew point temperature sensor 25, and a controller 26.

The first dew point temperature sensor 21 is arranged at an entrance of an exhaust gas passage 20 for sensing a dew point temperature of the untreated airflow as a reference temperature. The dew point temperature of the atmosphere may be sensed by a wet-bulb thermometer or a dry-bulb thermometer collocated with a relative hygrometer. The humidifier 22 is arranged in the exhaust gas passage 20 for spraying water mist all over the exhaust gas to increase humidity thereof and to wash the suspended particles. The condenser 23 is arranged in the exhaust gas passage 20 and located at a downstream end of the humidifier 22 for condensing the humidified exhaust gas into condensate contained the volatile organic compounds. The collecting tank 24 is arranged in the exhaust gas passage 20 and located under the humidifier 22 and the condenser 23 for collecting the condensate dropped from the humidifier 22 and the condenser 23 and the dropped condensate is transported back to the humidifier 22 by a circulation pump 241 for circulation spray. The second dew point temperature sensor 25 is arranged in the exhaust gas passage 20 for sensing a dew point temperature of the condensed exhaust gas passing through the condenser 23. The dew point temperature of the condensed exhaust gas may be sensed by a wet-bulb thermometer or a dry-bulb thermometer collocated with a relative hygrometer. The controller 26 is connected to the first dew-point temperature sensor 21, the condenser 23 and the second dew point temperature sensor 25 for feeding back the dew point temperature of the condensed exhaust gas sensed by the second dew-point temperature sensor 25 to the controller 26 to control the condensed level of the condenser 23 and the dew point temperature of the treated exhaust gas to be close to the reference temperature sensed by the first dew-point temperature sensor 21.

Figure 3:
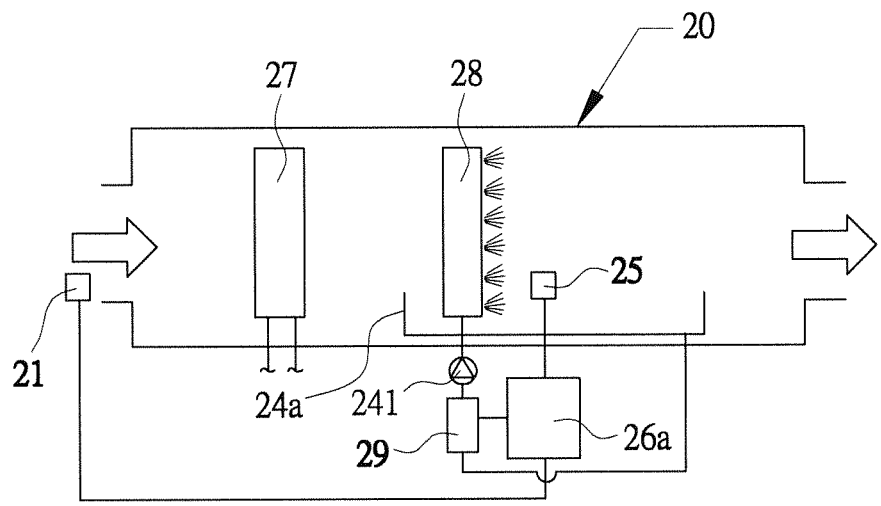
FIG. 3 is a structure schematic view of a second embodiment in accordance with the present invention.

With the referenced to FIG. 3, the second embodiment of the present invention comprises a first dew point temperature sensor 21, a cryogenic humidifier 28, a collecting tank 24a, a second dew point temperature sensor 25, and a controller 26a.

The first dew point temperature sensor 21 arranged at an entrance of an exhaust gas passage 20 for sensing a dew point temperature of the untreated airflow as a reference temperature. The dew point temperature of the atmosphere may be sensed by a wet-bulb thermometer or a dry-bulb thermometer collocated with a relative hygrometer. The cryogenic humidifier 28 arranged in the exhaust gas passage 20 for spraying water mist all over the exhaust gas to increase humidity thereof and cooling down and condensing the humidified exhaust gas into condensate contained the volatile organic compounds. In addition, the suspended particles may be washed by the cryogenic humidifier 28. The collecting tank 24a arranged in the exhaust gas passage 20 and located under the cryogenic humidifier 28 for collecting the condensate dropped from the cryogenic humidifier 28 and the dropped condensate is cooled down by a cooler 29 and then transported back to the cryogenic humidifier 28 by a recirculation pump 241 for circulation spray. The second dew point temperature sensor 25 arranged in the exhaust gas passage 20 for sensing a dew point temperature of the condensed exhaust gas passing through the cryogenic humidifier 28. The dew point temperature of the condensed exhaust gas may be sensed by a wet-bulb thermometer or a dry-bulb thermometer collocated with a relative hygrometer. The controller 26a connected to the first dew-point temperature sensor 21, the cooler 29 and the second dew point temperature sensor 25 for feeding back the dew point temperature of the condensed exhaust gas sensed by the second dew-point temperature sensor 25 to the controller 26a to control the condensed level of the cooler 29 and the dew point temperature of the condensed exhaust gas to be close to the reference temperature sensed by the first dew-point temperature sensor 21.

When the temperature of the untreated exhaust gas is too high, a pre-cooler 27 may be arranged in the exhaust gas passage 20 and located at an upstream end of the humidifier 22 or the cryogenic humidifier 28 for reducing the load of the condenser 23 or the cryogenic humidifier 28.

Figure 4:
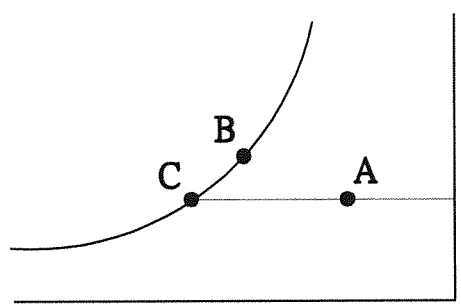
FIG. 4 is a schematic view of humidity changes in a psychrometric chart in accordance with the present invention.

FIG. 4 shows a psychrometric chart and the horizontal axis of the psychrometric chart represents the dry bulb temperature; the vertical axis of the psychrometric chart represents humidity ratio; the curved line is a relative humidity saturation line. The present invention uses the first dew point temperature sensor 21 to sense the dew point temperature of the untreated airflow as a reference temperature and point A shown in the psychrometric chart represents the humidity of the untreated airflow. The present invention then uses the humidifier 22 or the cryogenic humidifier 28 to spray water mist all over the exhaust gas to increase humidity and point B shown in the psychrometric chart represents the humidity of the humidified exhaust gas and point B is usually located on the relative humidity saturation line. The present invention finally uses the condenser 23 or the cryogenic humidifier 28 to condense the humidified exhaust gas, the second dew point temperature sensor 25 to sense the dew point temperature of the condensed exhaust gas, and the controller 26, 26a to control the dew point temperature of the condensed exhaust gas to be close to the reference temperature sensed by the first dew-point temperature sensor 21 and point C shown in the psychrometric chart represents the humidity of the condensed exhaust gas. Thus, the humidity of the exhaust gas is humidified from point A to point B and dehumidified to point C and due to point A and point C in the psychrometric chart have contour position on vertical axis, the humidity ratio of the exhaust gas is nearly unchanged through the pre- and post-treatment of the present invention.

Therefore, the condensate collected by the collecting tank 24, 24a does not increase nor decrease after circulation spray because of the unchanged humidity ratio of the exhaust gas so that waste water is hardly produced. Besides, the condensate contains more and more the volatile organic compounds after circulation spray so that the condensate with the high volatile organic compounds can be recycled and reused by circulation spray.

What is claimed is:

1. A process for treating volatile organic compounds (VOC's) contained in exhaust gas flow, comprising:
   a) an untreated airflow dew point temperature sensing step of sensing a dew point temperature of the untreated airflow as a reference temperature;
   b) a humidification and condensation processing step of spraying water mist all over the exhaust gas flow to increase humidity thereof and condensing the exhaust gas flow into condensate contained the volatile organic compounds;
   c) a treated exhaust gas flow dew point temperature sensing step of sensing a dew point temperature of the treated exhaust gas flow after the humidification and condensation processing step;
   d) a collection step of collecting dropped condensate from the humidification and condensation processing step and then transporting the dropped condensate back to the humidification and condensation processing step for circulation spray; and
   f) a control step of controlling the dew point temperature of the treated exhaust gas flow to be close to the reference temperature.

2. The process as claimed in claim 1, wherein the humidification and condensation processing step is simultaneously carrying out the humidification and condensation by spraying cooled down water mist.

3. The process as claimed in claim 1, wherein the humidification and condensation processing step is first carrying out by spraying water mist at a temperature close to the reference temperature of step a), then by performing condensation.

4. The process as claimed in claim 3 further including a pre-cooling step before the humidification and condensation processing step.

5. The process as claimed in claim 2 further including a pre-cooling step before the humidification and condensation processing step.

6. An apparatus of treating volatile organic compounds (VOC's) contained in exhaust gas flow, comprising:
   a first dew point temperature sensor arranged at an entrance of an exhaust gas passage for sensing a dew point temperature of the untreated airflow as a reference temperature;
   a humidifier arranged in the exhaust gas passage to spray water mist all over the exhaust gas flow for increasing humidity thereof;
   a condenser arranged in the exhaust gas passage and located at a downstream end of the humidifier to condense the exhaust gas flow into condensate contained the volatile organic compounds;
   a collecting tank arranged in the exhaust gas passage and located under the humidifier and the condenser to collect the condensate dropped from the humidifier and the condenser and transport the dropped condensate back to the humidifier for circulation spray;
   a second dew point temperature sensor arranged in the exhaust gas passage to sense a dew point temperature of the treated exhaust gas flow passing through the condenser; and
   a controller connected to the first dew-point temperature sensor, the condenser and the second dew point temperature sensor for feeding back a dew point temperature of the treated exhaust gas flow sensed by and the second dew-point temperature sensor to the controller to control the condensed level of the condenser and the dew point temperature of the treated exhaust gas flow to be close to the reference temperature sensed by the first dew-point temperature sensor.

7. The apparatus as claimed in claim 6, further comprising a pre-cooler arranged in the exhaust gas passage and located at an upstream end of the humidifier.

8. An apparatus of treating volatile organic compounds (VOC's) contained in exhaust gas flow, comprising:
   a first dew point temperature sensor arranged at an entrance of an exhaust gas passage for sensing a dew point temperature of the untreated airflow as a reference temperature;
   a cryogenic humidifier arranged in the exhaust gas passage to spray water mist all over the exhaust gas flow for increasing humidity thereof and to cool down and condense the exhaust gas flow into condensate contained the volatile organic compounds;
   a collecting tank arranged in the exhaust gas passage and located under the cryogenic humidifier to collect the condensate dropped from the cryogenic humidifier and the dropped condensate cooled down by a cooler and then transported back to the humidifier for circulation spray;
   a second dew point temperature sensor arranged in the exhaust gas passage to sense a dew point temperature of the treated exhaust gas flow passing through the condenser; and
   a controller connected to the first dew-point temperature sensor, the cooler and the second dew point temperature sensor for feeding back a dew point temperature of the treated exhaust gas flow sensed by and the second dew-point temperature sensor to the controller to control the condensed level of the cooler and the dew point temperature of the treated exhaust gas flow to be close to the reference temperature sensed by the first dew-point temperature sensor.

9. The apparatus as claimed in claim 8, further comprising a pre-cooler arranged in the exhaust gas passage and located at an upstream end of the humidifier.

* * * * *